United States Patent
Matas et al.

(10) Patent No.: US 11,235,265 B2
(45) Date of Patent: Feb. 1, 2022

(54) SUCTION ADAPTER FOR FILTRATION SCREENS

(71) Applicant: AMIAD WATER SYSTEMS LTD., Upper Galil (IL)

(72) Inventors: Oded Matas, KfarVradim (IL); Boaz Zur, Bikat Bet HaKerem (IL)

(73) Assignee: AMIAD WATER SYSTEMS LTD., Upper Galil (IL)

( * ) Notice: Subject to any disclaimer, the term of this patent is extended or adjusted under 35 U.S.C. 154(b) by 0 days.

(21) Appl. No.: 16/644,881

(22) PCT Filed: Jan. 8, 2019

(86) PCT No.: PCT/IL2019/050040
§ 371 (c)(1),
(2) Date: Mar. 5, 2020

(87) PCT Pub. No.: WO2019/138406
PCT Pub. Date: Jul. 18, 2019

(65) Prior Publication Data
US 2020/0330910 A1    Oct. 22, 2020

Related U.S. Application Data

(60) Provisional application No. 62/615,164, filed on Jan. 9, 2018.

(51) Int. Cl.
*B01D 29/15*    (2006.01)
*B01D 29/52*    (2006.01)
(Continued)

(52) U.S. Cl.
CPC ........... *B01D 29/668* (2013.01); *B01D 29/15* (2013.01); *B01D 29/232* (2013.01); *B01D 29/52* (2013.01);
(Continued)

(58) Field of Classification Search
CPC .... B01D 29/668; B01D 29/15; B01D 29/232; B01D 29/52; B01D 2201/0415; B01D 2201/082
See application file for complete search history.

(56) References Cited

U.S. PATENT DOCUMENTS 2,835,390 A     5/1958  King
3,256,995 A  *  6/1966  Schmid ................ B01D 29/232
                                              210/411
(Continued)

FOREIGN PATENT DOCUMENTS

WO        2012/073247 A1    6/2012

OTHER PUBLICATIONS

A supplementary European Search Report issued by the European Patent Office for corresponding European Patent Application No. 19739176.6, dated Jul. 20, 2021.

*Primary Examiner* — Waqaas Ali
(74) *Attorney, Agent, or Firm* — Myers Wolin, LLC

(57) ABSTRACT

A suction adapter for filtration systems is disclosed. The suction adapter is useful for filtration systems in which there are screen regions unapproachable by intake openings of nozzles of the suction scanner, such as the case with pleated screens. The suction adapter comprises a partitioning adapted to match within a space-extension of a predetermined size and shape, whereby being useful for tunneling a suction power from an intake opening of the suction scanner to a screen region unapproachable by the intake opening. A method for cleaning a filtration screen having screen regions gapped from a closest approach of an intake opening of a suction scanner is disclosed. The method comprises providing immovable tunneling means between the screen regions and a location of the closest approach, whereby tunneling a suction power of the suction scanner to respective spots on (Continued)

Figure 1A:
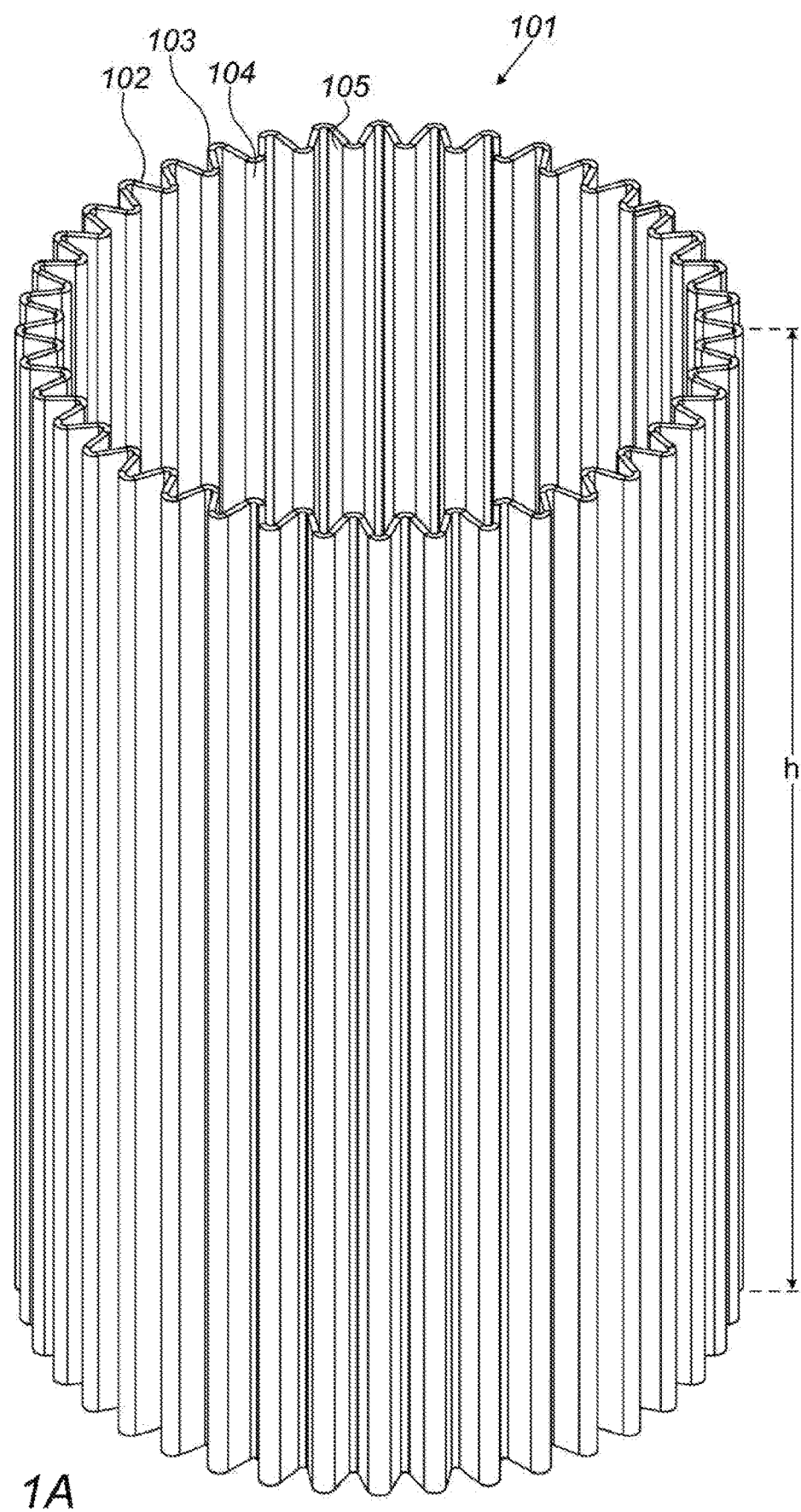

the screen regions when closely approached, respectively, by the intake opening.

17 Claims, 6 Drawing Sheets

(51) Int. Cl.
    *B01D 29/66*      (2006.01)
    *B01D 29/23*      (2006.01)

(52) U.S. Cl.
    CPC ............ *B01D 2201/0415* (2013.01); *B01D 2201/082* (2013.01)

(56) References Cited

U.S. PATENT DOCUMENTS

| | | | |
|---|---|---|---|
| 3,511,374 A * | 5/1970 | Beal ................. | B01D 29/15 209/258 |
| 2017/0128860 A1 | 5/2017 | Cartarius et al. | |
| 2018/0071967 A1* | 3/2018 | Schroder ............. | B01D 29/21 |

* cited by examiner

SUCTION ADAPTER FOR FILTRATION SCREENS

CROSS-REFERENCE TO RELATED APPLICATION

This application claims the benefit of provisional patent application No. 62/615,164 filed Jan. 9, 2018, entitled "SUCTION ADAPTER FOR FILTRATION SCREENS", which is hereby incorporated by reference in its entirety without giving rise to disavowment.

TECHNICAL FIELD

The present disclosure relates to the field of self-cleaning filtration systems, and more specifically filtration system using suction scanners.

BACKGROUND

Suction scanners are used in automatic self-cleaning filtration systems for cleaning screen filters fully automatically and without interrupting the filtration process.

Suction scanners make use of focused back-flushing, in which a suction force is created by reversing the flow through a small region of the screen element. A differential pressure is created between the positive working pressure of the filtration system, and the atmospheric pressure to which the flushing path is open. The differential pressure results with a high velocity fluid stream traveling backward through the small region of the screen element, thereby pulling the debris layer off the screen.

Among known suction scanners there are scanners that take rotational scanning path only, and scanners that take rotational and axial scanning paths simultaneously, resulting in helical scanning path.

Using a helical scanning path allows to divide the screen area into smaller cleaning intended regions.

Pleated screens are used in all sorts of filtration systems for fluids (e.g. air, fuel, oil, water). A main advantage of a pleated screen (either flat or cylindrical) over a corresponding non-pleated screen, is a larger screen area per a given flow rate of the screened fluid.

The pleated structure of screens reduces the efficiency of their cleaning by suction, and therefore pleated screens in many (if not most) filtration systems are either disposable or require manual cleaning.

BRIEF SUMMARY

A first broad aspect of the presently disclosed subject matter is a suction adapter. The suction adapter is for filtration systems having a suction scanner for self-cleaning, and also having space-extensions extending outwardly from a location of the suction scanner and delineated by screen regions unapproachable by intake openings of nozzles of the suction scanner. The suction adapter comprises a partitioning adapted to match within a space-extension of a predetermined size and shape, whereby being useful for tunneling a suction power from an intake opening of the suction scanner to a screen region unapproachable by the intake opening.

In various embodiments the suction adapter further comprises a perforated sheet having perforations in alignment with cavities formed by the partitioning.

The perforations can be arranged following a spiral line. In various embodiments in which intake opening of nozzles of the suction scanner move helically, the spiral line about which the perforations are arranged, may be formed matching a helical scanning path of the suction scanner In various embodiments of the disclosed subject matter, the partitioning comprises at least one unit of interconnected partitioning segments.

In various embodiments of the disclosed subject matter having at least one unit of interconnected partitioning segments, the at least one unit comprises at least one group of vertically-spaced lateral partitioning segments interconnected by a vertical segment, wherein the vertical segment constitutes a vertical partitioning segment.

In various embodiments of the disclosed subject matter, the partitioning comprises at least one unit of interconnected partitioning segments, wherein the at least one unit of interconnected partitioning segments comprises at least one group of vertically-spaced lateral partitioning segments interconnected by a perforated sheet or by a vertical segment.

In various embodiments of the disclosed subject matter, the partitioning comprises at least one partitioning element, the at least one partitioning element comprises a plurality of units of interconnected partitioning segments.

A second broad aspect of the presently disclosed subject matter, is a filter element for use in self-cleaning filtration systems having suction scanner for self-cleaning of the filter element, the filter element comprises a screen for removing solid particles from a fluid passing through, and is characterized by comprising at least one suction adapter according to said first broad aspect.

In various embodiments of the presently disclosed subject matter, the suction adapter comprises at least one cavity stationary to the screen and extending across a gap between a predetermined screen-spot located within a cleaning intended area on the screen and between a plane to be approached during suction scanning by an intake opening of a nozzle associated with a suction scanner, the cavity being opened at a first end thereof to the screen-spot and being partitioned from remaining cleaning intended screen areas, and at a second end thereof being opened to the plane, whereby a suction power can be tunneled from the intake opening to the screen-spot when the second end of the cavity is approached by the intake opening.

In various embodiments of the presently disclosed subject matter, the suction adapter comprises a plurality of partitioning segments, wherein each cavity is delimited by one or more partitioning segments.

In various embodiments of the presently disclosed subject matter, the partitioning segments protrude toward the screen from a surface of a perforated sheet opposite a surface thereof to be scanned by an intake opening of the suction scanner.

In various embodiments of the presently disclosed subject matter, a perforated sheet intermediates between the plane and the cavities. In some embodiments the perforated sheet comprises openings that are arranged following a spiral line.

In various embodiments of the presently disclosed subject matter, the perforated sheet comprises a predetermined number of openings, each in alignment with a second end of a respective cavity wherein openings in the perforated sheet constitute each an integral extension of a respective cavity.

In various embodiments of the presently disclosed subject matter, the screen is a pleated screen. In various embodiments in which the filter element comprises a pleated screen, the pleated screen has a cylindrical-envelop shape sharing a longitudinal axis with a rotatable main tube of the suction scanner, wherein a plurality screen pleats extend between an imaginary internal cylindrical plane tangential to vertical trough lines of the pleats and between an external cylindrical plane tangential to vertical crest lines of the pleats.

In various embodiments of the presently disclosed subject matter in which the filter element comprises a pleated screen and the suction adapter comprises a perforated sheet, the perforated sheet is a cylindrical perforated sheet located inside the pleated screen tangentially to the trough lines of the screen.

In various embodiments of the presently disclosed subject matter, a plurality of partitioning segments are located in respective groups within vertical space-extensions created between each pair of neighboring pleats and between an imaginary cylindrical envelop delineating an area scannable by intake openings of nozzles of the suction scanner or an outer surface of a cylindrical perforated sheet which inner surface thereof is scannable by intake openings of nozzles of the suction scanner.

A third broad aspect of the presently disclosed subject matter is a self-cleaning filtration system comprising a suction adapter according to said first broad aspect.

In various embodiments of the presently disclosed subject matter the self cleaning filtration system comprises a filter element according to said second broad aspect.

In various embodiments of the presently disclosed subject matter, the self-cleaning filtration system comprises a pleated screen and a partitioning element, wherein said partitioning element constituting a suction adapter extending between a plane scannable by at least one intake opening of a nozzle of a suction-scanner and between cleaning intended screen-spots located on screen pleats remotely from the plane.

Some filtration systems according to the presently disclosed subject matter comprise a chamber having at least one fluid inlet in fluid communication with a first space in the chamber, said first space is intended for raw fluid; at least one fluid outlet in fluid communication with a second space in the chamber, said second space is intended for filtered fluid; a screen comprising at least one screen element, wherein said screen parting between the first space for raw fluid and the second space for filtered fluid and allowing for fluid communication between said first and second spaces; at least one suction nozzle located inside the space for uncleaned fluid and having an intake opening for focused cleaning of a predetermined screen area of the screen; a mechanism for providing a respective motion between the at least one suction nozzle and the screen, wherein a distance between the intake opening of the suction nozzle and the screen has a minimal value per each cleaning intended screen-spot on the predetermined screen area, respectively, when the nozzle takes its closest approach in front of each such screen-spot during said motion, wherein at least per part of the predetermined screen area, said minimal value is substantially greater from zero due to a gap between the intake opening and the screen, wherein a suction adapter is provided at the gap for tunneling between the intake opening and a cleaning intended screen-spot on the predetermined screen area when the intake opening is in alignment with a second end opening of a cavity formed in the suction adapter, wherein a first end opening of the cavity is in alignment with a cleaning intended screen-spot.

A fourth broad aspect of the presently disclosed subject matter is a partitioning element for use in filtration systems having a filter element and a suction scanner for self-cleaning of the filter element, the partitioning element comprises partitioning segments adapted in size and in shape for bridging a gap between a screen and a plane to be scanned by an intake opening of the suction scanner or a plane of a perforated sheet opposite a plane thereof to be scanned by an intake opening of the suction scanner.

A fifth broad aspect of the presently disclosed subject matter, is a method for cleaning a filtration screen having screen regions gapped from a closest approach of an intake opening of a suction scanner, the method comprising: providing immovable tunneling means between the screen regions and a location of the closest approach, whereby tunneling a suction power of the suction scanner to respective spots on the screen regions when closely approached, respectively, by the intake opening.

In some embodiments of the presently disclosed subject matter, said method further comprises rotating the suction scanner to cause the intake opening to follow a helical path on a cylindrical envelope surrounding the suction scanner, whereby the intake opening/s is/are approaching the immovable tunneling means to perform self-cleaning of the screen regions.

DETAILED DESCRIPTION

One technical problem dealt by the disclosed subject matter is to increase the intensity of backflows through screens during self-cleaning sessions, in cases where there is a gap between a cleaning intended screen region and the closest approach of an intake opening of a suction scanner to that region.

Another technical problem dealt by the disclosed subject matter is to improve the efficiency of suction scanners in cleaning pleated screens, both in terms of minimizing fluid loss in carrying out the cleaning process, and in terms of maximizing the removal of dirt off the screen.

The disclosed subject matter may provide for one or more technical improvements over any pre-existing technique and any technique that has previously become routine or conventional in the art.

Additional technical problem, solution and effects may become apparent to a person of ordinary skill in the art in view of the present disclosure.

In a first broad aspect of the presently disclosed subject matter, a filter element for use in filtration systems having suction scanner for self-cleaning of the screen of a filter element is disclosed, the filter element comprises a screen for removing solid particles from a fluid passing through, and at least one suction adapter extending between a predetermined cleaning intended area on the screen and between a plane to be approached by an intake opening of a nozzle associated with the suction scanner, for tunneling a suction power from the intake opening to at least one cleaning intended screen-spot included in the predetermined cleaning intended area, when the intake opening approaches a suction adapter's tunneling cavity associated with the at least one cleaning intended spot during a suction scanning session (and regardless of the scanning order or method). Each tunneling cavity is formed by one or more partitioning segments. A plurality of partitioning segments connected in one piece, constitute a partitioning element. The suction adapter may comprise one or more partitioning elements.

In various embodiments of the disclosed subject matter the suction scanner uses a helix scanning method for dividing the screen area into smaller cleaning intended regions, thereby increasing the suction intensity and reducing momentary flush flow, thereby minimizing the impact of the self-cleaning process on the pressure of clean fluid at the output of the filtration system.

In various embodiments of the disclosed subject matter, the suction adapter comprises a perforated sheet located internally to the screen location, with respect to the nozzles, adjacent to a plane to be scanned by intake openings of the suction scanner nozzles. The perforated sheet intermediates between the intake openings and respective partitioning elements. In various embodiments of the disclosed subject matter, a partitioning element is configured to divide the gap between the cleaning intended screen region and the closest approach of an intake opening of the suction scanner to that region, into a plurality of tunneling cavities extending between the screen and the perforated sheet, whereby the screen area is divided into respective cleaning intended spots. The perforated sheet comprises a plurality of perforations configured to communicate fluid flow from respective cavities into the intake openings of the suction scanner nozzles, when perforations located adjacently to the respective cavities are approached by the intake openings. In various embodiment the perforated sheet is a metal sheet part.

In various embodiments the perforated sheet is in the form of a cylindrical envelop surrounding the suction scanner.

In various embodiments of the disclosed subject matter the perforation is arranged in a helical path (i.e. follows a spiral line) along the cylindrical envelope.

In various embodiments of the disclosed subject matter, at least some of the partitioning elements are either secured to the perforated sheet, connected to the perforated sheet, e.g. by welding, or produced in one piece with the perforated sheet, thereby constituting a one-piece suction adapter unit.

A second broad aspect of the disclosed subject matter is a suction adapter unit for suction scanners.

One exemplary embodiment of the second broad aspect of the disclosed subject matter is for use in a pleated screen element having a height h, an internal cylindrical space of a radius r, and a plurality of vertical space-extensions extending outwardly from the internal cylindrical space. In various embodiments of the disclosed subject matter, an individual suction adapter comprised of one or more partitioning element/s is provided per each of the vertical space extensions. In various embodiments of the disclosed subject matter, the suction adapter for use in the pleated screen element comprises a fishbone-like partitioning element having both vertical and horizontal (hereinafter referred to also as 'lateral') partitioning segments. In various embodiments of the disclosed subject matter a plurality of individual partitioning elements (e.g. fishbone-like partitioning element) are connected to a common perforated sheet. The connection between the partitioning elements and the perforated sheet is by any acceptable connection method, e.g. by welding, by gluing, by mold casting them in one piece, by printing them as one-piece by a 3D printer, or the like. In some cases, the connection may be permanent. In other cases, the connection may be temporary, such as by pushing them together, by screws, by snap connections, or the like. The individual partitioning elements are spaced from one another in match with a spacing between respective vertical space-extensions of the pleated screen. In various embodiments, the perforated sheet has a cylindrical contour constituting an envelope for the internal cylindrical space. In various other embodiments the perforated sheet has a contour constituting a predetermined portion of a cylinder (or of other desired geometrical design that fits into the internal space of a pleated screen of concern). In various embodiments a plurality of such predetermined portions is provided, each portion is configured to add up with a predetermined number of others to form together a cylindrical contour (or a contour of the other desired geometrical design).

The vertical and lateral partitioning segments create cavities (may be referred to also as "cells") between a front end of the partitioning element to be positioned adjacently to the screen within a vertical space-extension, and between a back end of the partitioning element configured to meet a plane to be scanned by an intake opening of the suction scanner (with or without the intermediation of a perforated sheet according to the first broad aspect of the disclosed subject matter).

In various embodiments of the disclosed subject matter, the partitioning element in which the cavities are provided is formed from injected polymeric material.

A third broad aspect of the disclosed subject matter is a self-cleaning filtration system.

One exemplary embodiment of the third broad aspect of the disclosed subject matter is a filtration system for fluids, comprising a chamber having at least one fluid inlet in fluid communication with a first space in the chamber, said first space is intended for uncleaned fluid, at least one fluid outlet in fluid communication with a second space in the chamber, said second space is intended for cleaned fluid, at least one screen element parting between the space for uncleaned fluid and the space for clean fluid and allowing for clean fluid communication between said first and second spaces; at least one suction nozzle located inside the space for uncleaned fluid and having an intake opening for focused cleaning of a predetermined screen area, one cleaning intended screen-spot at a time, said filtration system further comprises a mechanism for providing a respective motion between the at least one suction nozzle and the screen, wherein a distance between the intake opening of the suction nozzle and the screen has a minimal value per each cleaning intended screen-spot on the screen area, respectively, when the nozzle takes its closest approach in front of each such spot during said motion, wherein at least per part of the predetermined screen area said minimal value is substantially greater from zero due to a gap between the intake opening and the screen, wherein a suction adapter is provided at the gap for tunneling between the intake opening and a cleaning intended screen-spot on the screen area when the nozzle is at its closest approach in front of the spot.

In various embodiments of the disclosed subject matter the suction adapter comprises a plurality of tunneling cavities each in front of a specific screen-spot to be cleaned.

In various embodiments of the disclosed subject matter a plurality of tunneling cavities end substantially evenly at a side thereof facing the nozzle thereby allowing for nearly zero distance between the intake opening and an opening of each cavity when the intake opening is aligned with a cavity's opening.

In various embodiments of the disclosed subject matter a plurality of tunneling cavities end substantially touching, nearly touching, or connected to, at a side thereof facing the nozzle, a perforated sheet intermediating between the tunneling cavities and a closet approach plane scanned by the intake opening during suction scanning, thereby allowing for nearly zero distance (the distance being nearly equal to a thickness of the perforated sheet) between the intake opening and an opening of each cavity when the intake opening is aligned with a cavity's opening.

Figure 1B:
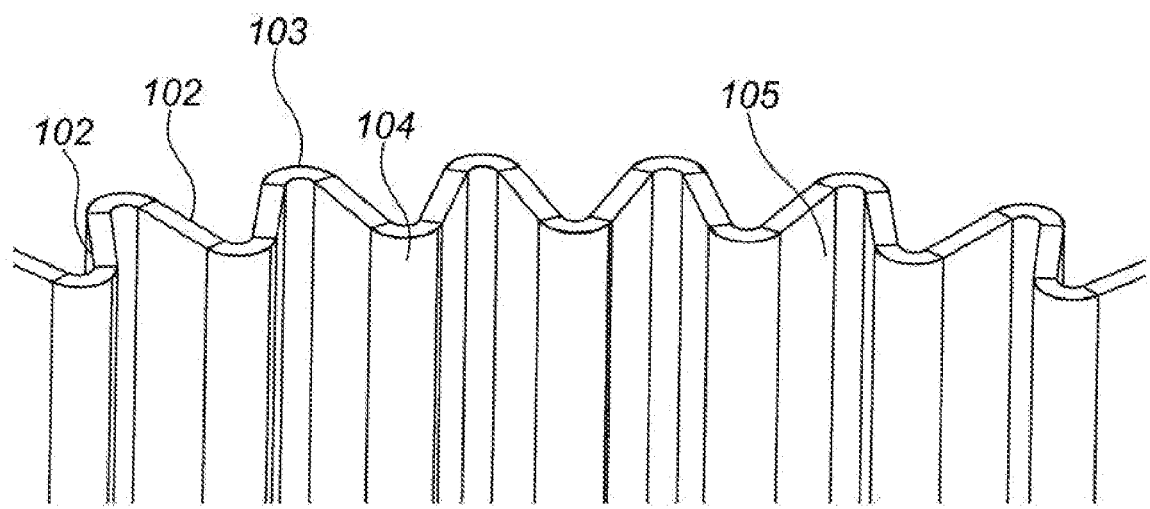

FIG. 1A illustrates a screen element 101 for use in a self-cleaning filtration system according to the presently disclosed subject matter. FIG. 1B shows, in an enlarged view, a top portion of the screen element of FIG. 1A. The screen element 101 is a pleated screen element, having a predetermined height h and a predetermined number of substantially identical pairs of pleats 102 (referred to also as "folds"). Each pair of neighboring pleats 102 shares a common crest line 103 and meets a pleat 102 of a next pair, at a trough line 104. The pairs of pleats 102 are angularly spaced about a common vertical axis, such that an inner cylindrical space having a predetermined number of outwardly extending vertical space-extensions 105, is enclosed by the screen. In the illustrated embodiment, the vertical axis is parallel to and equidistant, respectively, from the vertically extending crest and trough lines 103 and 104.

It is to be noted that terms relating to the orientation of elements in embodiments of the disclosed subject matter (such as 'vertical', 'horizontal' 'height'), are relative, and refer to their orientation in the figures, for the sake of simplicity of the description. The actual orientation of these elements may vary as a matter of design and of the actual orientation of the filtration system in use.

The screen element 101 is delimited between two imaginary coaxial cylinders, an inner smaller one, (having a radius r), tangential to the trough lines 104, and a larger outer one, (having radius R), tangential to the crest lines 103. The inner space delimited by the pleated screen is thus comprised from a cylindrical space defined by said inner imaginary cylinder, and from a plurality of vertical space-extensions 105 extending from said inner cylinder and delimited each by a respective pair of neighboring pleats 102.

As can be appreciated, the pleated screen 101 can thus be used in a filtration chamber that can hold a hypothetic cylindrical (non-pleated) screen having the same radius R and the same height h. The pleated screen 101 yet comprises a significantly greater screening area (comparing to the area of a non-pleated screen) due to its pleats 102, which provide it with a greater envelope area.

Figure 2:
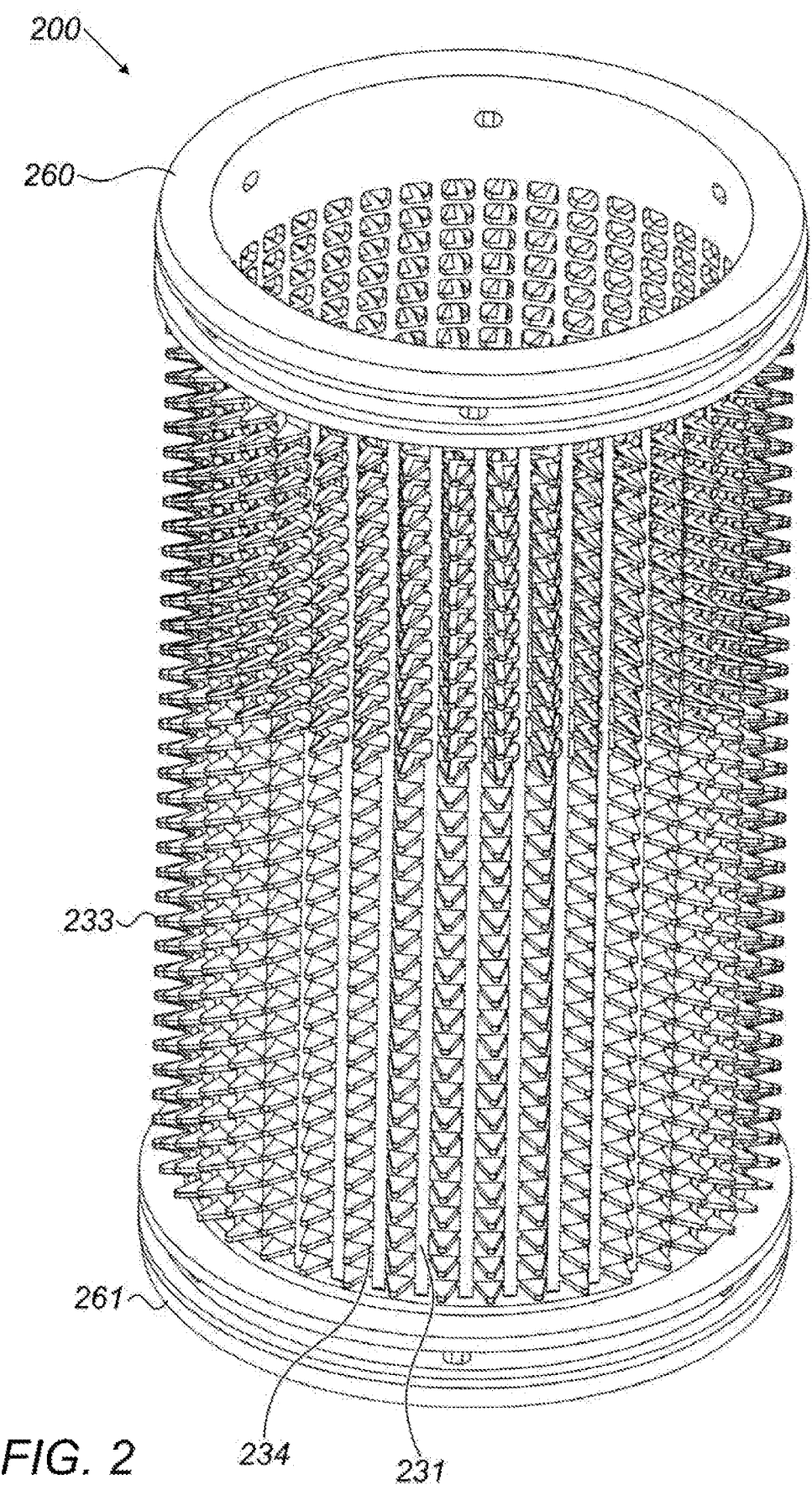

FIG. 2 illustrates a suction adapter 200 in which the partitioning has a cage-like design (accordingly, a suction adapter having a cage-like design will be referred to hereinafter also a "cage"). The cage may be configured for holding and supporting the pleated screen 101 of FIG. 1A, in position inside a filtration chamber (not illustrated), with the pleated screen 101 overlaid over the cage. The cage 200 may have a general hollow cylinder shape having outer dimensions fitting into the filtration chamber and inner dimensions matching a closest approach plane to be traced by the intake opening/s of nozzle/s of a suction scanner during a self-cleaning session. A partitioning, such as cage 200, may further have a plurality of a secondary-shape pattern, each secondary-shape pattern constituting a unit of interconnected partitioning segments. Each unit of interconnected partitioning segments may comprise one or more groups of vertically-spaced lateral partitioning segments such as segments 233, interconnected by respective vertical segments, e.g. the vertical pieces 231. The partitioning thus comprises cavities, formed between the segments 233. The plurality of units of interconnected partitioning segments may be superimposed onto a common constructional arrangement to form a partitioning element, e.g. a cage. In the illustrated embodiment the plurality of units of interconnected partitioning segments are in match, in number and in contour, with a respective plurality of the vertical space-extensions 105 of the pleated screen 101. In the illustrated embodiment the secondary-shape pattern is provided by groups of lateral partitioning segments, each group comprising a plurality of horizontal partitioning segments 233 vertically spaced along the height of the cylinder shape. The groups of partitioning segments are angularly spaced around the cylinder shape in match with the vertical space-extensions 105 of the pleated screen 101.

The cage 200 may have top and bottom rings 260, 261 by which it can be secured in a predetermined position within the filtration chamber. A distance between the top and bottom rings may be h in match with the height of the pleated screen 101. In alternative embodiments, the top and the bottom ends of the pleated screen are maintained to a predetermined extent within the top and the bottom rings, respectively. The height of the pleated screen can thus be somewhat greater than a distance between the bottom of the top ring and a top of the bottom ring, and the top and the bottom rings may have wavy grooves matching the top and the bottom end contours of the pleated screen, such that predetermined top and bottom portions of the pleated screen are inserted into the wavy grooves. Each group of partitioning segments 233 is separated from a neighboring group by a thin vertical piece 231 extending from nearly the bottom of the top ring 260 to nearly the top of the bottom ring 261 of the cage 200. The vertical pieces 231 are configured to touch or nearly touch the troughs 104 of the pleated screen 101, once overlaid over the cage. Suction openings 234 are formed in the cage and are separated one from another, in the vertical direction by the lateral partitioning segments 233. The openings 234 are separated from on another laterally, by the vertical pieces 231.

Figure 3A:
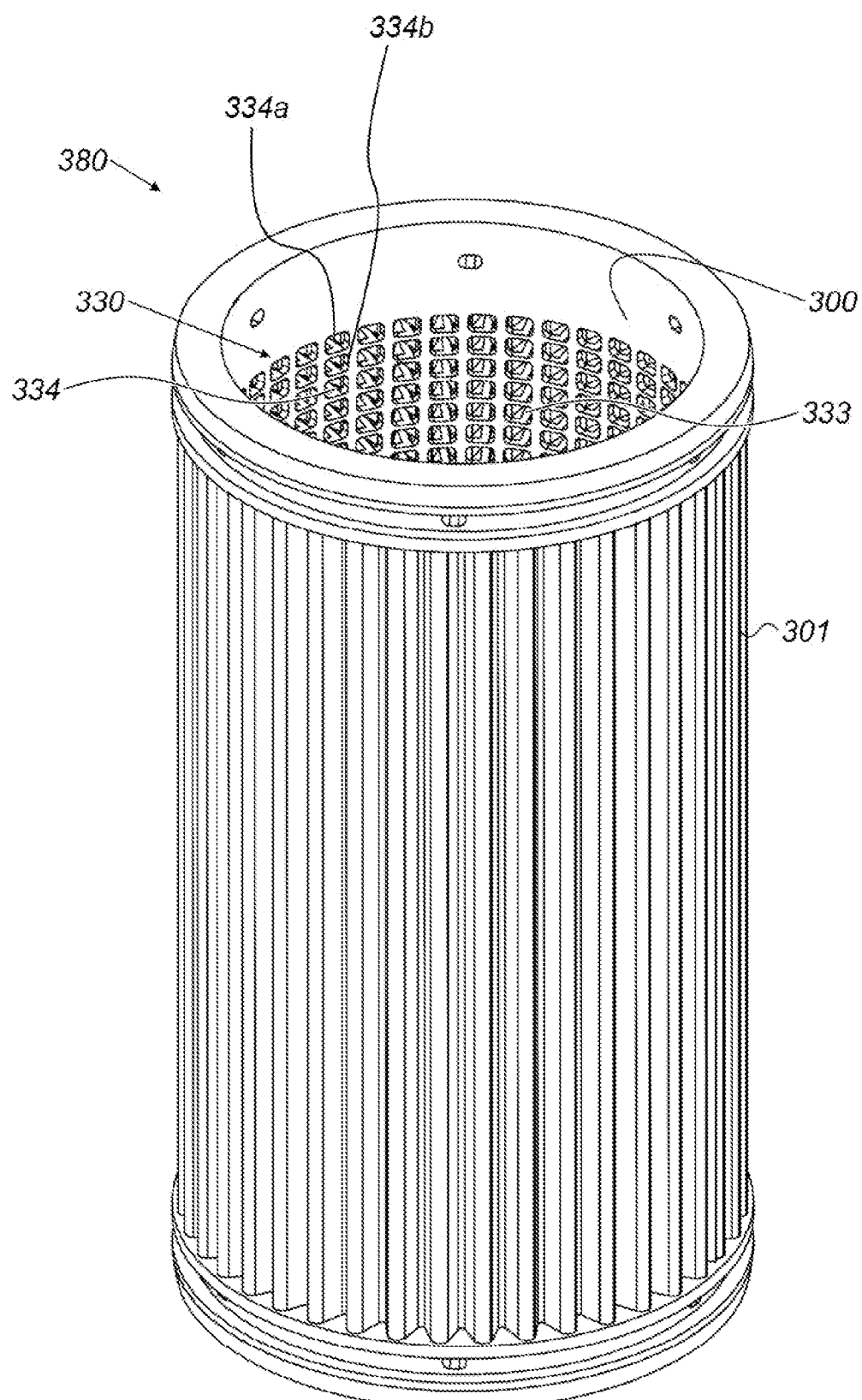
Figure 3B:
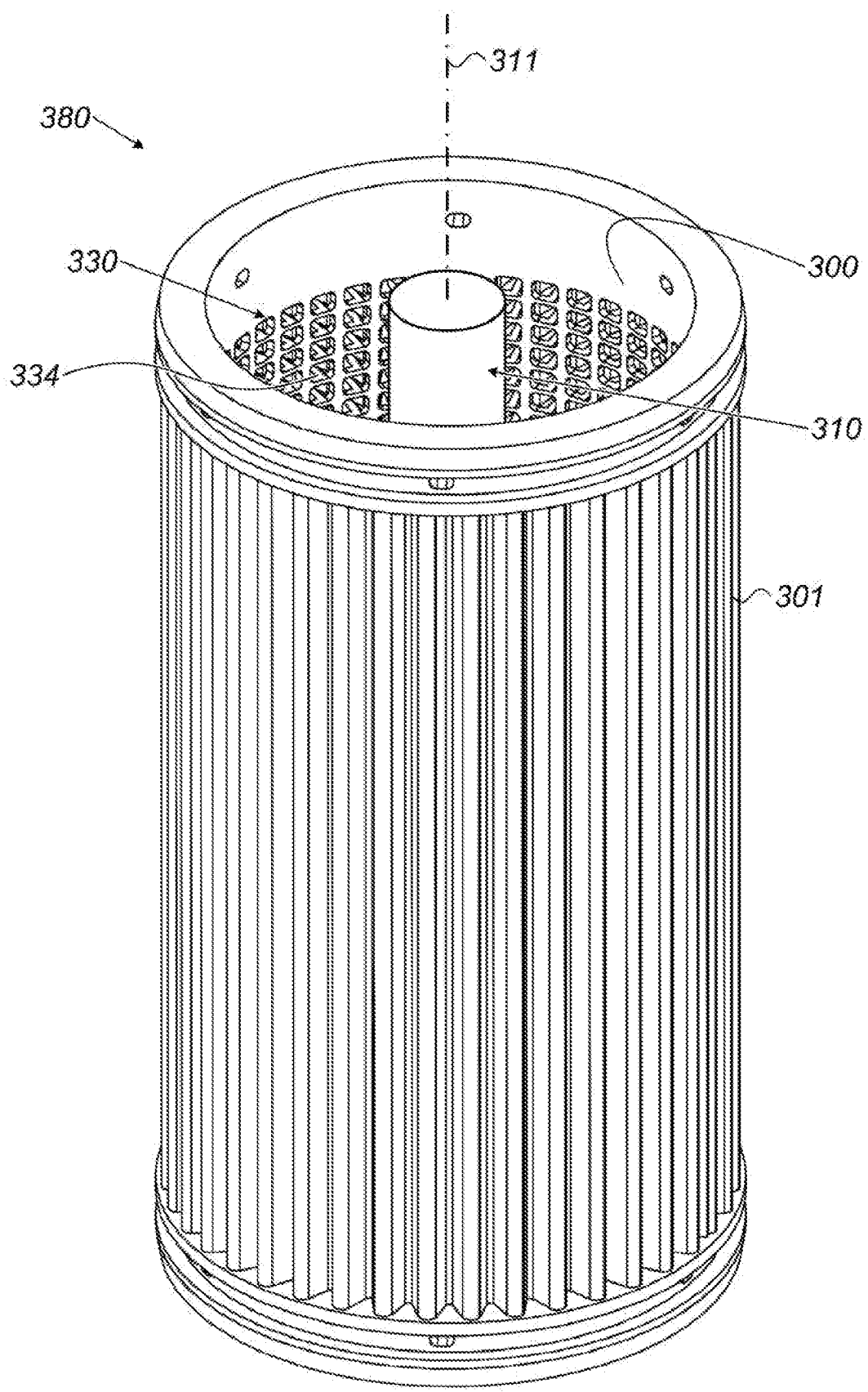

FIG. 3A illustrates a filtration assembly 380 comprising a pleated screen 301 mounted onto a cylindrical cage, suction adapter 300. The pleated screen 301 covers the cage from its outer side, between the top and bottom rings. FIG. 3B illustrates the filtration assembly 380 in position about a main drain pipe 310 of a suction scanner. The suction scanner's drain pipe 310 extends substantially coaxially about the longitudinal axis 311 (corresponding to longitudinal axis 411 of FIG. 4 and 511 of FIG. 5), of the assembly, through the cylinder-like shape of the cage 300 as well as through the pleated screen 301. Filtride washed-out during a self-cleaning session are drained through the main drain pipe 310.

As can be further appreciated, the suction scanner's main drain pipe 310 may be provided inside the pleated screen 301, within said inner cylindrical space, in a manner that allows for respective rotation between the pleated screen 301 and the suction scanner's main drain pipe 310, about their common imaginary axis. The suction scanner's main drain pipe 310 may have a plurality of nozzles (e.g., 450 of FIG. 4) extending therefrom and having respective intake openings located closely to the screen 301, for cleaning the screen 301. During a cleaning session, the fluid pressure in the nozzles drops to a value below that of the pressure in the fluid outside the screen 301, thereby generating reverse flows of fluid from an outer side of the screen 301, through the screen, and into the nozzles.

As can be appreciated, a gap between the closest approach of an intake opening of a nozzle of the suction adapter and a screen spot located on the area of screen 101 may vary according to a contour of the screen (unless the screen is plainly cylindrical and is arranged coaxially with the rotation axis of the suction scanner, in which case the separation between the intake opening of the nozzle and a screen spot located on the area of screen is invariable, i.e. is the same for any point on the screen spot when the intake opening is at is closest approach). In embodiments in which the screen is pleated, when the intake opening 451 becomes momentarily aligned (during respective rotation between the suction scanner 310 and the pleated screen 101) in front of a trough 104 of the pleated screen 101, the gap between the intake opening and the screen is minimal. When an intake opening is not aligned in front of a trough 104, it is aligned in front of a vertical space-extension 105. While scanning a screen region delineating the space-extension, the gap varies depending on the momentary position of the intake opening with respect to the pair of pleats 102 that delimit the vertical space extension 105, and separates the intake opening between from the screen 101 with a respective varying distance in between. The respective distance becomes maximal when the intake opening is at closest approach in front of a screen crest 103.

The suction adapter 300 comprises a plurality of lateral partitioning segments 333, which together provide for a secondary-shape pattern of the suction adapter 300. The lateral partitioning segments 333 are configured to be positioned in the vertical space-extensions 105, delimited by a respective pair of neighboring pleats 102, and by the inner cylindrical envelop defined by the radius r, thereby dividing the vertical space extensions 105, each into a plurality of cavities.

It is noted that the partitioning segments 333 may or may not be integral parts of the cage 300. In some embodiments, the partitioning segments 333 may be separable from the cage 300 and added thereon. Additionally, or alternatively, the partitioning segments 333 may be formed as part of the cage 300. In some cases, the partitioning segments 333 are integral with the cage 300.

In some embodiments, each partitioning segment 333 may provide mechanical support to a respective portion of the pleated screen 101, thereby reducing the likelihood the pleated screen 101 will become deformed or otherwise be damaged by the suction forces applied by the nozzle 450, when performing a cleaning operation.

The plurality of lateral partitioning segments 333 are arranged and spaced substantially parallelly one above another. As a matter of design, they may or may not be interconnected by vertical partitioning members. Each group of partitioning segments 333 located within one of the vertical space-extensions 105 (with or without vertical partitioning members in between them) divides the respective space extension 105, into a plurality of horizontal cavities, wherein each of the cavities is tunneling between a predetermined spot on the inner cylindrical envelope and a respective predetermined screen-spot on the pleated screen 101.

In various embodiments of the disclosed subject matter, suction adapter 300 may comprise a plurality of non-horizontal partitioning segments dividing the vertical space extensions 105 into a plurality of special shape cavities, e.g. honeycomb-like cavities, or into a plurality of diagonally oriented cavities.

In some cases, each group of horizontal partitioning segments 333 is positioned within a specific vertical space extension 105, at a particular desired height within its respective vertical space-extension 105. As will be later explained, in various embodiments of the disclosed subject matter, the distance between the bottoms of the groups of horizontal partitioning segments 333 and a bottom end of the pleated screen may slightly vary from one group of partitioning segments 333 to a next one, in correlation with a helical scanning path to be followed by the nozzles 450 of the suction scanner during a cleaning session. In some embodiments, the cavities are located so as that a height of the intake openings of the nozzles (e.g., 451) will always be aligned with the height of the cavities approached by.

The edge contour of a horizontal partitioning segment 333, at a side thereof to be facing a screen's pleat, is substantially in match with the contour of the lateral cross section of the vertical space-extensions 105, such that a respective group of partitioning segments 333 will fit as a whole inside a respective vertical space extension 105, with the lateral edges of the lateral partitioning segments 333 touching or nearly touching the respective screen pleats 102. In embodiment in which a vertical partitioning member is included, a front end thereof will be touching or nearly touching either a screen's crest line 103 (in case the vertical partitioning member is located equidistant from respective screen pleats 102), or a vertical pleat line parallel to the crest line 103. A rear edge of each lateral partitioning segment 333 (as well as that of the rear edge of the vertical partitioning member, should it exist in the embodiment) is substantially in match with the contour of the envelope of the inner cylinder as defined by the radius r.

In various embodiments of the disclosed subject matter a cylindrical perforated sheet 330 is positioned inside the screen 101, tangentially to the troughs 104 of the pleats 102. A plurality of suction openings 334 are formed in the cylindrical perforated sheet 330. The suction openings 334 are dimensioned such that when the cylindrical perforated sheet is in a predetermined position with respect to the partitioning segments 333, each of the suction openings 334 is aligned with an opening of a respective cavity formed by the partitioning segments of a respective suction adapter 300.

In various embodiments of the disclosed subject matter at least a predetermined section of the cylindrical perforated sheet 330 and a plurality of the partitioning segments 333 are connected together, thereby forming a one-piece suction adapter unit.

In various embodiments of the disclosed subject matter, the vertical distance of the openings 334 from a bottom end of the screen 301 varies gradually from one opening to a next opening in the lateral direction. In the disclosed embodiment, the vertical distance of the openings 334 from a bottom end of the screen 301 decreases clockwise such that after one turn starting from a first opening 334a, the position of a first opening 334b of a next turn is right underneath the position of the first opening. Since there is exactly one column of openings 334 in front of each pleat 102, in case the openings 334 are rectangular and are spaced evenly both in the vertical and in the lateral directions, the inclination of the spiral path along which the openings 334 are arranged is about 1/n, where n is the number of pairs of the pleats 102. It is to be noted that in some embodiments the number of openings in the perforated sheet per a turn may not be a whole number, in which case the position of a first opening of a next turn may be shifted from right underneath the position of the first opening of a previous turn.

The inclination of the spiral arrangement of the openings 334 is configured to match the spiral path to be taken by the nozzles of a suction scanner with which the pleated screen 301 is intended to cooperate in a filtration system according to the disclosed subject matter.

Groups of horizontal partitioning segments 333 are positioned inside the vertical space extensions 105 in gradually varying distances from the bottom of the screen 101 such that the cavities created by the horizontal partitioning segments 333 remain in full alignment each with its respective opening 334 in the perforated sheet 330.

As can be appreciated, the cavities formed by the suction adapter function to momentarily extend the nozzle: when an intake opening 451 of a nozzle 450 of the suction scanner is brought into alignment with a specific suction opening 334 during a cleaning session (see FIG. 4), the suctioning generated through that nozzle will be tunneled by the respective cavity, mainly to a specific spot on the screen 301, limited by the partitioning segments associated with the specific opening 334. The reverse flow of fluid from the outer side of the screen into the intake opening of the nozzle, will thus be more intensive through this screen spot than through other screen regions, thus will more effectively remove dirt (known also in the term 'cake' of screened particles accumulating on the interiors of screen elements) from the screen into the nozzle.

Figure 4:
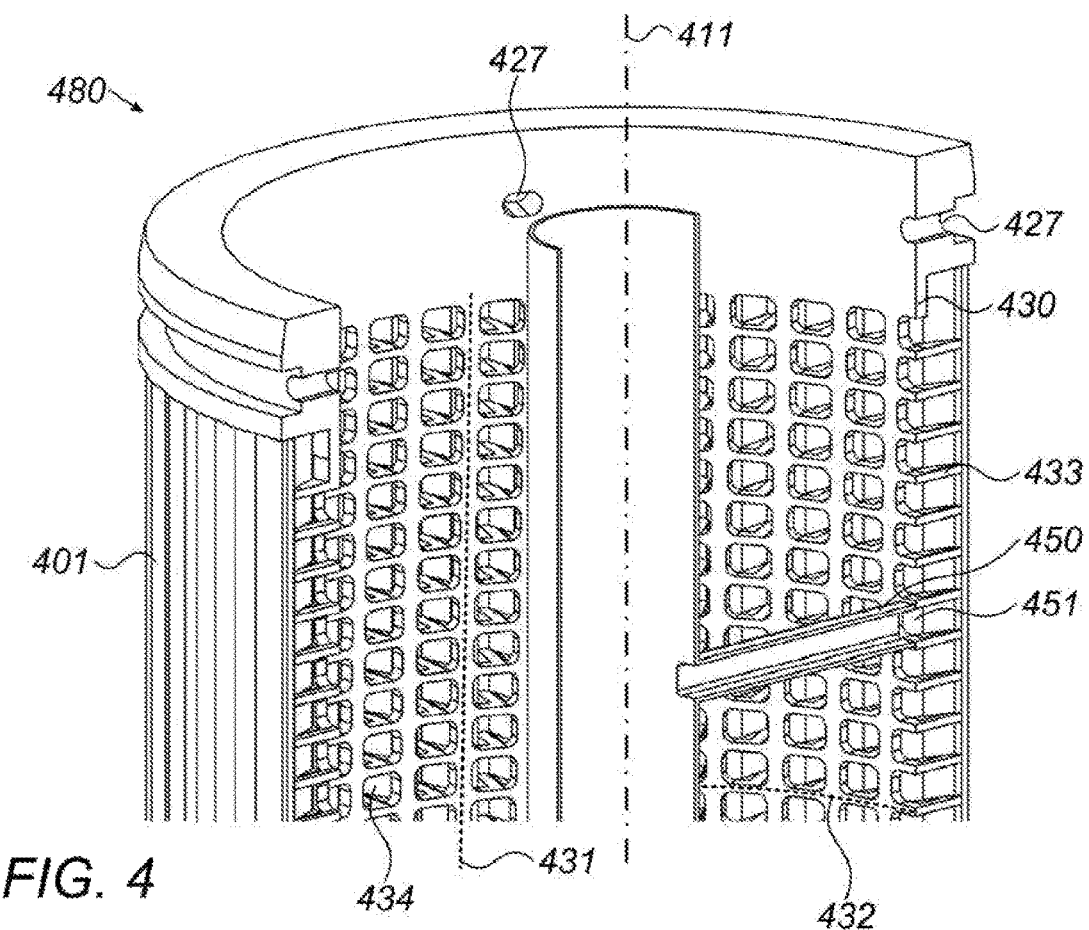

FIG. 4 illustrates a vertical section of a filtration assembly 480 comprising a screen element 401 and a suction adapter, for use in a self-cleaning filtration system according to the presently disclosed subject matter. The screen element 401 is a pleated screen element, of an embodiment similar to that of the screen element 101 of FIG. 1. A cylindrical perforated sheet 430 is positioned inside the screen 401, tangentially to the troughs 104 of the pleats 102. Each pair of neighboring pleats 102 creates a vertical space-extension 105. Each vertical space-extension 105 is separated from the inner cylindrical space of the screen by a respective region of the cylindrical perforated sheet 430. A group of lateral partitioning segments 433, is located respectively inside each vertical space-extension 105, and is delimited between a pair of neighboring pleats 102 and between the cylindrical perforated sheet 430.

A plurality of suction openings 434 are formed in the cylindrical perforated sheet 430. In the embodiment disclosed in this figure, the openings 434 are arranged in a single helical line, starting clockwise with an opening near the bottom (not shown in the figure) of the cylindrical perforated sheet 430, and ending with an opening near the top of the cylindrical perforated sheet. The helical arrangement is such that the openings 433 are spaced in the vertical direction by a thin helical piece 432 (an exemplifying segment in a mid-portion thereof is annotated by a horizontal dotted line 432 for clarity) of the cylindrical envelope 430, starting above said first opening, and ending underneath the last opening. While the suction openings 434 are substantially identical in their shape and dimensions for most of the perforated sheet, the height of some openings near the starting and the ending of the helical line may vary such that the perforations of the perforated sheet end-up parallelly, i.e. equidistant from the top and bottom ends of the cage.

In the lateral direction, the openings 434 are dimensioned and spaced such that the number of suction openings 434 per a turn of the helical arrangement is fixed, and such that the first suction opening 434 in each next turn, is aligned with the first suction openings 434 in the previous turn/s. The openings 434 thus form vertical columns of suction openings 434, wherein each column of suction openings 434 is separated from a next column by a thin vertical piece 431 extending from nearly the top end to nearly the bottom end of the cylindrical envelope 430 (an exemplifying vertical piece is annotated by a vertical dotted line 431 for clarity).

The openings 434, the thin helical piece 432, and the plurality of thin vertical pieces 431 are dimensioned such that when the cylindrical perforated sheet 430 is in position inside the screen 101, the vertical pieces 431 are in alignment with and touch or nearly touch respective trough lines 104 of the screen 101.

In various alternative embodiments, there is at least one vertical partitioning segment provided in between each pair of the vertical pieces 431 that are in alignment with a respective pair of trough lines 104. In suction adapters which comprise vertical partitioning segments situated within the vertical space-extension between the screen and the inner cylindrical space of the screen, additional vertical pieces may be provided in between the vertical pieces 431, touching or nearly touching the back ends of a vertical partitioning segments. In some of such alternative embodiments, the back ends of the vertical partitioning segments constitute said additional vertical pieces.

In various embodiments of the disclosed subject matter having suction adapters with vertical partitioning segments, the width of a vertical piece (between a pair of vertical pieces 431), is substantially equal to the width of a vertical partitioning segment.

In various embodiments of the disclosed subject matter, the width of the helical piece 432 is substantially equal to the width of the horizontal partitioning segment 433.

In various embodiments of the disclosed subject matter, the horizontal partitioning segments 433 in a suction adapter are slightly inclined with respect to the vertical pieces 431, wherein their inclination is in match with the inclination of the helical piece 432.

In various embodiments of the disclosed subject matter the inclination of the helical path is about 12 millimeters per a turn, in a pleated screen having an internal diameter of about 30 cm.

The suction openings 434, the vertical pieces 431 and the helical piece 432, are either integral with back ends of the partitioning segments of partitioning elements located within the vertical space extensions, or are dimensioned such that when the cylindrical perforated sheet is in a predetermined position with respect to the pleated screen 101, each of the suction openings 434 is aligned with an opening of a respective cavity formed by the lateral partitioning segments 433 (and by the vertical partitioning segments in embodiments in which vertical partitioning segments are provided in the vertical space extensions) of a respective partitioning element.

When the perforated cylindrical sheet 430 is in position inside the screen 101, the groups of partitioning segments are aligned such that their partitioning segments 433 are aligned with the vertical pieces 431 and with the helical piece 432 of the sheet 430, respectively, and such that the openings 434 are in alignment with the cavities created by the partitioning segments.

Punches 427 may be provided near the top and bottom ends of the filtration assembly 480 for securing it to base and top covers (not shown) which close the internal space of the screen element 401 from its bottom and top ends, respectively.

In various embodiments of the disclosed subject matter the pleated screen may be stabilized and protected from its outer side by an array of external ring-like holders (not illustrated), each having an internally facing end contoured in match with the outer contour of the pleated screen 401. The array of external holders may comprise a plurality of parallelly arranged holders, spaced one from above another along the height of the screen. In various embodiments of the disclosed subject matter, the external holders are secured in their positions by means of vertical rods. The rods and the rings can be secured together (e.g. by welding, by fitting the rods inside snugly matching apertures formed through the ring holders, or the like) to form an external support structure. The external support structure may be secured to the filtration assembly by connecting the rods at their ends to bottom and top plates that close the space enclosed by the screen, from its top and bottom ends.

In some embodiments, springs (not shown) may be positioned between the perforated cylindrical sheet 430 and the pleated screen 401, providing flexibility to the sheet 430 when pushed against by the nozzle. In some exemplary embodiments, the springs may be mounted in bores, on the troughs 104 of the pleats 102, or the like.

Figure 5:
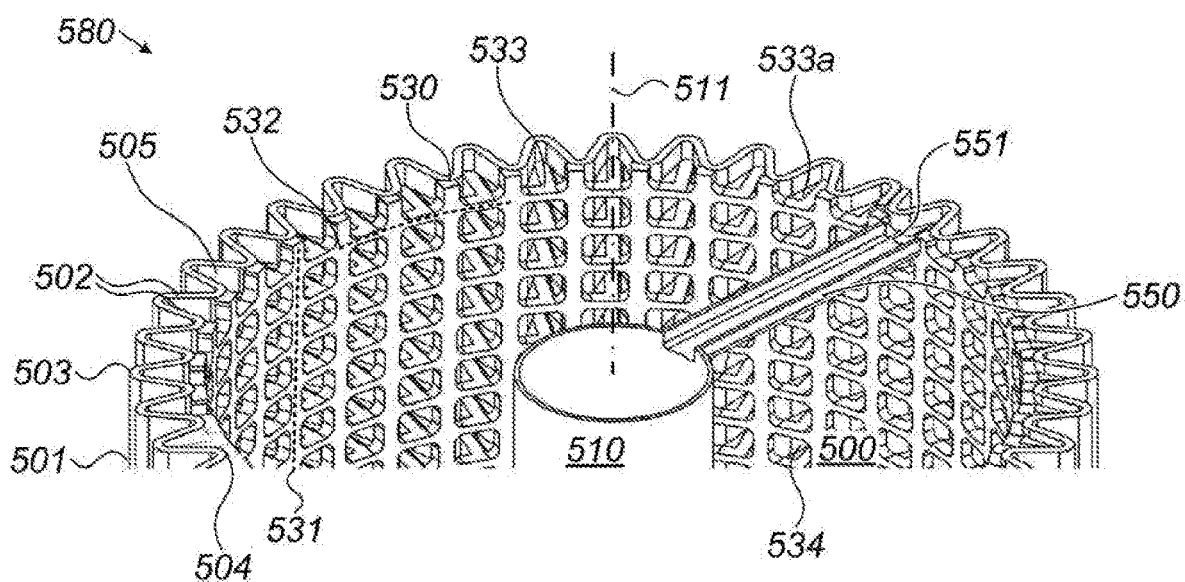

FIG. 5 illustrates a lateral section through a filtration assembly 580 for use in a self-cleaning filtration system according to the presently disclosed subject matter. The filtration assembly 580 is of an embodiment of a pleated screen assembly similar to the embodiment illustrated by FIG. 3C. A pleated screen 501 is mounted on a cage. Each pair of neighboring screen pleats 502 that share a common crest line 503, delimits a vertical space-extension 505. The space-extensions 505 are in fluid communication with an inner cylindrical space encompassed by the screen 501. In various embodiments, this fluid communication is through suction openings 534 formed in a cylindrical perforated sheet 530. The cylindrical perforated sheet 530 is arranged tangentially to trough lines 504, which are formed in between the pairs of neighboring pleats 502 (in the context of the present disclosure, neighboring pleats are pleats 502 that share a common crest line 503).

Vertical pieces 531 of the cylindrical perforated sheet 530 separate between vertical columns of suction openings 534 (an exemplifying vertical piece is annotated by a vertical dotted line 531 for clarity). The vertical pieces 531 are aligned with and touch (or nearly touch) respective trough lines 504 of the cylindrical perforated sheet 530. In various embodiments the cage may comprise between every pair of vertical pieces 531 (and hence in between every pair of troughs 504) at least another vertical piece constituting a rear edge of respective vertical partitioning segment of the suction adapter in embodiments in which vertical partitioning segments extend through the vertical space extensions 505.

Helical piece 532 of the cylindrical perforated sheet 530 delimits the suction openings 534 at their top and bottom ends (an exemplifying segment of the helical piece is annotated by a curved dotted line 532 for clarity). The helical piece 532 is aligned with and touches or nearly touches the back ends of the lateral partitioning segments 533. In various embodiments (e.g. embodiments in which the perforated sheet is integral to the partitioning elements), the back ends of the lateral partitioning segments constitute the helical piece 532.

In some exemplary embodiments, cavities may be created between the suction openings 534 and the body of the screen 501, one cavity per each opening 534. Each cavity provides for as short as possible fluid path between a specific opening 534 and a corresponding spot on the screen. A corresponding screen-spot related to a specific opening 534 of the perforated sheet 530 is a screen region extending in front of the specific opening 534 between the front ends of neighboring partitioning segments which their back ends meet (and in various embodiments constitute) respective segments of the helical piece 532 and of the vertical pieces 531, which delimit the opening 534.

In the context of the present disclosure a 'front' side of an element under discussion is the side of the element that faces (and is the closest to) the screen. Likewise, a 'back' side of an element under discussion is the side of the element opposite its front (and is the remotest from the screen).

A nozzle 550 is shown in a lateral cross section view, aligned in front of a specific cavity formed by a pair of lateral partitioning segments 533 and by respective vertical and lateral pieces 531 and 532 of a suction adapter, which their back ends delimit a respective opening 534 formed in the cylindrical sheet 530. An intake opening 551 of the nozzle, is aligned with the cavity, such that the cavity serves as a temporal extension for the nozzle, for tunneling the suction force from the nozzle to a specific spot on the screen element.

In various embodiments, the nozzle tip may be provided with a flanged region, sufficiently wide for shutting (or at least partially shutting) neighboring openings 534, thereby focusing the suction force mainly towards the specific opening 534 with which the intake opening 551 of the nozzle is temporary aligned during its suction scanning motion.

In various embodiments of the presently disclosed subject matter, the lateral partitioning segments 533 are of varying thickness each. For example, the thickness of a lateral partitioning segment 533 may be tapering from a mid-portion thereof towards screen facing edges thereof. Regions 533a of the lateral partitioning segment 533 may accordingly be thinner than the thickness of the back ends thereof 532, thereby minimizing overlapping area between the edges of the portioning segments and the screen, thus maximizing the open-area of the screen 501.

When the term "about" is associated with a stated dimension, size, count, measurement and the like, up to 10% deviation is concerned, unless explicitly stated otherwise.

The terminology used herein is for the purpose of describing particular embodiments only and is not intended to be limiting of the disclosed subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosed subject matter has been presented for purposes of illustration and description, but is not intended to be exhaustive or limited to the disclosed subject matter in the form disclosed. Many modifications and variations will be apparent to those of ordinary skill in the art without departing from the scope and spirit of the disclosed subject matter. The embodiment was chosen and described in order to best explain the principles of the disclosed subject matter and the practical application, and to enable others of ordinary skill in the art to understand the disclosed subject matter for various embodiments with various modifications as are suited to the particular use contemplated.

What is claimed is:

1. A suction adapter for filtration systems having a suction scanner for self-cleaning an area of a screen by suctioning and having space-extensions extending outwardly from a location of the suction scanner and delineated by screen regions contoured between screen troughs and screen crests, wherein at the screen crests an inner face of the screen is remoter from the closest approach of the intake opening of a nozzle of the suction scanner than in the screen troughs, thus a screen area between a screen trough and a respective screen crest is unapproachable by intake openings of nozzles of the suction scanner, the suction adapter comprises:

a partitioning adapted to match within a space-extension of a predetermined size and shape contoured between a respective screen trough and a respective screen crest, whereby being utilized for tunneling a suction power from an intake opening of the suction scanner to a screen region unapproachable by the intake opening, wherein the partitioning comprises at least one unit of interconnected partitioning segments; and a perforated sheet having perforations in alignment with cavities formed by the partitioning, wherein partitioning segments protrude toward the screen from a surface of the perforated sheet opposite a surface thereof are to be scanned by the intake opening of the suction scanner.

2. The suction adapter according to claim 1, wherein the perforations are arranged following a spiral line, matching a helical scanning path of the suction scanner.

3. The suction adapter according to claim 1, wherein the at least one unit of interconnected partitioning segment comprises at least one group of vertically-spaced lateral partitioning segments interconnected by a vertical segment, wherein the vertical segment constitutes a vertical partitioning segment.

4. The suction adapter according to claim 1, wherein the at least one unit of interconnected partitioning segments comprises at least one group of vertically-spaced lateral partitioning segments interconnected by the perforated sheet or by a vertical segment.

5. The suction adapter according to claim 1, wherein the partitioning comprises at least one partitioning element, the at least one partitioning element comprises the plurality of units of interconnected partitioning segments.

6. A filter element for use in self-cleaning filtration system having suction scanner for self-cleaning of the filter element, the filter element comprises a screen for removing solid particles from a fluid passing through, and is characterized by comprising at least one suction adapter according to claim 1, wherein the suction adapter comprises at least one cavity stationary to the screen and extending across a gap between a predetermined screen-spot located within a cleaning intended area on the screen and between a plane to be approached during suction scanning by an intake opening of a nozzle associated with a suction scanner, the cavity being opened at a first end thereof to the screen-spot and being partitioned from remaining cleaning intended screen areas, and at a second end thereof being opened to the plane, whereby a suction power can be tunneled from the intake opening to the screen-spot when the second end of the cavity is approached by the intake opening: wherein the suction adapter comprises a plurality of partitioning segments, wherein each cavity is delimited by on or more partitioning segments: wherein partitioning segments protrude toward the screen from a surface of a perforated sheet opposite a surface thereof to be scanned by an intake opening of the suction scanner.

7. The filter element according to claim 6, wherein a perforated sheet intermediates between the plane and the cavities.

8. The filter element according to claim 7, wherein the perforated sheet comprises openings that are arranged following a spiral line.

9. The filter element according to claim 7, wherein the perforated sheet comprises a predetermined number of openings, each in alignment with a second end of a respective cavity wherein openings in the perforated sheet constitute each an integral extension of a respective cavity.

10. The filter element according to claim 6, wherein the screen is a pleated screen.

11. The filter element according to claim 10, wherein the pleated screen has a cylindrical-envelop shape sharing a longitudinal axis with a rotatable main tube of the suction scanner, wherein a plurality screen pleats extend between an imaginary internal cylindrical plane tangential to vertical trough lines of the pleats and between an external cylindrical plane tangential to vertical crest lines of the pleats.

12. The filter element according to claim 11 comprising a perforated sheet, wherein the perforated sheet is a cylindrical perforated sheet located inside the pleated screen tangentially to the trough lines of the screen.

13. The filter element according to claim 11, wherein a plurality of partitioning segments are located in respective groups within vertical space-extensions created between each pair of neighboring pleats and between an imaginary cylindrical envelop delineating an area scannable by intake openings of nozzles of the suction scanner or an outer surface of a cylindrical perforated sheet which inner surface thereof is scannable by intake openings of nozzles of the suction scanner.

14. A self-cleaning filtration system comprising a suction adapter according to claim 1.

15. A self-cleaning filtration system comprising a filter element according to claim 6.

16. The suction adapter according to claim 1, wherein the at least one unit of interconnected partitioning segments comprises at least one group of lateral partitioning segments, wherein each lateral partitioning segment has a thinner width at a backend thereof, whereby minimizing overlapping area between edges of the lateral partitioning segments and the screen.

17. The filter element according to claim 6, wherein the at least one unit of interconnected partitioning segments comprises at least one group of lateral partitioning segments, wherein each lateral partitioning segment has a thinner width at a backend thereof, whereby minimizing overlapping area between edges of the lateral partitioning segments and the screen.

* * * * *